United States Patent [19]

Teach et al.

[11] Patent Number: 4,662,707
[45] Date of Patent: May 5, 1987

[54] LIGHTHOUSE STRUCTURE AND COMPENSATING LENS IN REFERENCE LASER BEAM PROJECTING APPARATUS

[75] Inventors: Ted L. Teach, Dayton; Mark D. Sobottke, Kettering, both of Ohio

[73] Assignee: Spectra-Physics, Inc., San Jose, Calif.

[21] Appl. No.: 781,094

[22] Filed: Sep. 27, 1985

[51] Int. Cl.⁴ .............................................. G02B 26/08
[52] U.S. Cl. ..................................................... 350/6.5
[58] Field of Search .................. 350/6.5, 6.7, 6.8, 319, 350/432, 433, 434, 436, 582, 587, 589, 590, 99, 248; 340/981; 356/149; 362/35

[56] References Cited

U.S. PATENT DOCUMENTS

| | | | |
|---|---|---|---|
| 2,384,540 | 9/1945 | Flint | 350/319 |
| 3,100,085 | 8/1963 | Dover | 362/311 |
| 3,588,255 | 6/1971 | Alexander . | |
| 3,781,121 | 12/1973 | Gross . | |
| 3,966,238 | 6/1976 | Wiklund . | |
| 4,062,634 | 12/1977 | Rando et al. | 356/149 |
| 4,387,362 | 6/1983 | Gosswiller | 350/99 |
| 4,468,119 | 8/1984 | Hamar . | |
| 4,502,783 | 3/1985 | Lau et al. . | |

FOREIGN PATENT DOCUMENTS 768822 2/1957 United Kingdom ................ 350/590

Primary Examiner—John K. Corbin
Assistant Examiner—Vincent J. Lemmo
Attorney, Agent, or Firm—Killworth, Gottman, Hagan & Schaeff

[57] ABSTRACT

An apparatus for projecting a laser beam in a reference plane includes several imrovements. A generally cylindrical, one-piece molded transparent lighthouse structure overlies the rotatable pentaprism beam diverting assembly of the apparatus. The lighthouse structure is mounted on the housing so as to allow transmission therethrough of the rotating laser beam projected by the beam diverting assembly. The lighthouse structure has a tapered or conical configuration facilitating molding thereof, but which produces a divergence of the laser beam as it passes through the structure. A continuous resilient flexible ring is adapted to releasably attach to the apparatus housing and tightly fit about the lighthouse structure for removably anchoring the structure to the housing in a sealed relationship, providing a water-tight enclosure for the pentaprism beam diverting assembly and imposing a generally uniform attaching pressure about the lighthouse structure. A beam compensating lens aligned across the laser beam and coupled with the beam diverting assembly for movement therewith. The compensating lens being in the form of a positive meniscus lens is configured to correct the divergence in the laser beam which occurs when the beam passes through the one-piece molded lighthouse structure.

20 Claims, 3 Drawing Figures

LIGHTHOUSE STRUCTURE AND COMPENSATING LENS IN REFERENCE LASER BEAM PROJECTING APPARATUS

BACKGROUND OF THE INVENTION

The present invention generally relates to apparatus for providing a reference laser beam and, more particularly, to laser beam projecting apparatus having a generally cylindrical continuous lighthouse structure and a compensating lens. The compensating lens corrects for divergence of the reference beam before it emerges from the projecting apparatus through the lighthouse structure such that the projected reference beam will have a level of intensity and range of detectability substantially equivalent to a beam transmitted undeviated through a planar window having parallel surfaces.

Laser beam systems have been employed in numerous surveying and construction applications. In one such system disclosed in U.S. Pat. No. 4,062,634, which issued Dec. 13, 1977 to Rando et al and is assigned to the assignee of the present invention, a laser beam projecting apparatus provides a rotating laser beam which establishes a reference plane. Typically, the rotating laser beam is used to provide a continuous plane of light that creates a constant horizontal bench mark of elevation over an entire work area. Also, the system employs one or more laser beam detectors, placed at considerable distances from the projecting apparatus, for intercepting the rotating laser beam and determining the proper elevation at selected points throughout the work area.

In the laser beam projecting apparatus, the generally horizontal rotating reference laser beam is produced by projecting the beam generally upward and then deflecting it ninety degrees within a pentaprism or penta-mirror assembly. The pentaprism assembly is rotated about a vertical axis within the projecting apparatus to cause the horizontal beam to rotate and define the reference plane.

To adapt the reference laser beam projecting apparatus for use in surveying and construction applications under a variety of field conditions, the projecting apparatus is provided with a waterproof housing having an upper transparent lighthouse assembly within which the pentaprism assembly rotates and through which the laser beam is projected. The lighthouse assembly typically includes four upstanding flat transparent panes of glass of high optical quality which are joined together at their side edge surfaces so as to form a square in cross section. The lower edges of the panes are mounted within recessed seats formed in an upper rim of the housing, while the upper edges of the panes are mounted within recessed seats formed within a top casing of the housing. The upper and lower edges of the panes are sealed by gaskets. Four posts are threadably mounted between the top casting and upper rim for applying sufficient axial forces to pull them together and lock the panes into their seats. The four posts are aligned radially outwardly of corner junctures formed between the panes, while the panes have forty-five degree bevel side edge surfaces which interface to form the corner junctures and which are sealed together by a suitable adhesive.

While providing precise beam positioning, the lighthouse assembly described above is made up of a number of components which require careful attention and precise aligning and positioning in order to assemble it. Specifically, the panes through which the laser beam passes must be of extremely high optical quality. This requires extensive, careful individual inspection of a large number of similar panes until ones of suitable optical quality are found. Then, the individual panes must be carefully ground to precise dimensions to provide the bevel side edge surfaces which form the corner junctures of the lighthouse. Finally, the panes must be positioned very precisely relative to one another and adhered together at their bevel side edge surfaces. It is, therefore, seen that a need exists for improvement of the lighthouse assembly construction which will eliminate some of the above-outlined difficulties encountered in selecting and fitting the components of the lighthouse assembly together.

SUMMARY OF THE INVENTION

The present invention provides improvements in the reference laser beam projecting apparatus which are designed to satisfy the aforementioned needs. One of these improvements comprises a generally cylindrical transparent lighthouse structure overlying a beam diverting assembly of the projecting apparatus, such as the pentaprism assembly. The cylindrical lighthouse structure is mounted on the housing of the apparatus so as to allow transmission of the rotating laser beam therethrough. In the preferred embodiment, the lighthouse structure is made of a transparent thermoplastic material, such as acrylic resin, and has a one-piece molded construction. The lighthouse structure also has a tapered or conical configuration for facilitating molding thereof. However, such configuration produces a measurable divergence of the laser beam in the reference plane as it passes through the lighthouse structure.

Another improvement of the present invention comprises a continuous resilient flexible ring for removably anchoring the lighthouse structure to the apparatus housing in a sealed relationship so as to provide a watertight enclosure for the pentaprism beam diverting assembly. The ring is adapted to releasably attach to the housing and tightly fit about the light house structure for removably anchoring the lighthouse structure to the housing so as to impose a generally uniform attaching pressure about the lighthouse structure.

Still another improvement of the present invention is a beam compensating means aligned in the path of the laser beam and configured to correct the known divergence in the laser beam which occurs when the beam passes through the lighthouse structure. More particularly, the divergence produced in the conical cylindrical lighthouse structure is a variable divergence of the laser beam as it passes through the lighthouse structure. The divergence varies in a direction generally perpendicular to the reference plane defined by the rotating laser beam. In the preferred embodiment, the compensating means is a lens having variable converging power in planes generally parallel to the reference plane and zero converging power in planes generally perpendicular to the reference plane such that the lens corrects or compensates for the divergence created by the molded lighthouse structure. In particular, the compensating lens has a uniform center cross-sectional thickness in the vertical direction and is in the form of a positive meniscus lens. The radii of front and rear surfaces of the positive meniscus compensating lens change linearly in the vertical direction, with the radius of the rear surface being longer than that of the front surface at each plane through the lens surfaces parallel to the reference plane. As in the case of the lighthouse structure, the compensating lens is also composed of a transparent thermoplastic material.

Accordingly, it is an object of the present invention to provide a reference laser beam projecting apparatus having a generally cylindrical one-piece molded lighthouse structure which simplifies the construction and assembling of the components of the apparatus; to provide the molded lighthouse structure with a conical configuration which facilitates molding thereof; to provide a laser beam compensating lens which corrects for divergence produced in the beam as it passes through the molded lighthouse structure; and to provide a resilient flexible ring to tightly, but releasably, anchor the molded lighthouse assembly to the housing of the apparatus so as to apply uniform gripping pressure about the lighthouse structure.

Other objects and advantages of the invention will be apparent from the following description, the accompanying drawings and the appended claims.

DETAILED DESCRIPTION OF THE PREFERRED EMBODIMENT

Figure 1:
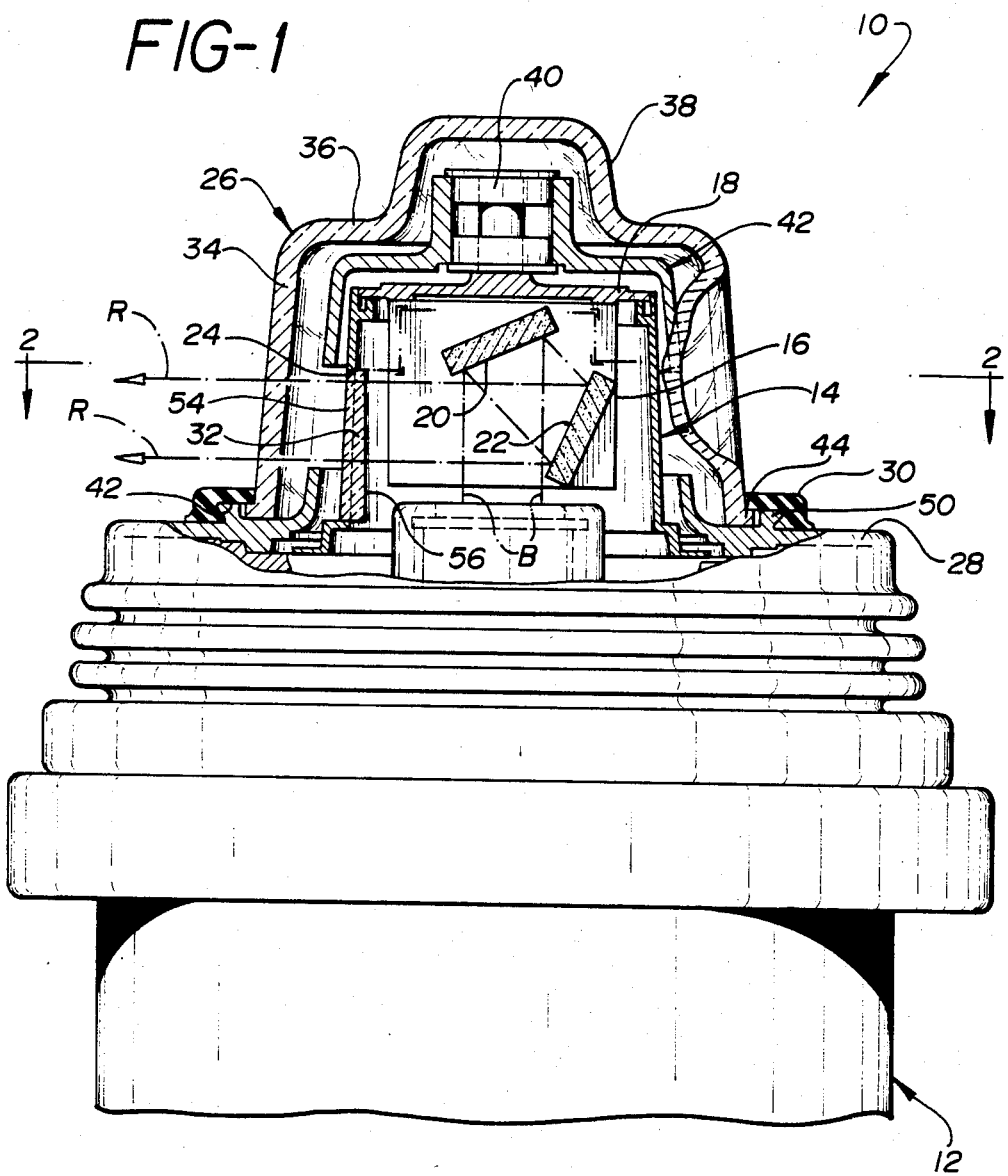
FIG. 1 is a side elevational view, partly in section, of the upper portion of the laser beam projecting apparatus employing the improvements of the present invention.
Figure 2:
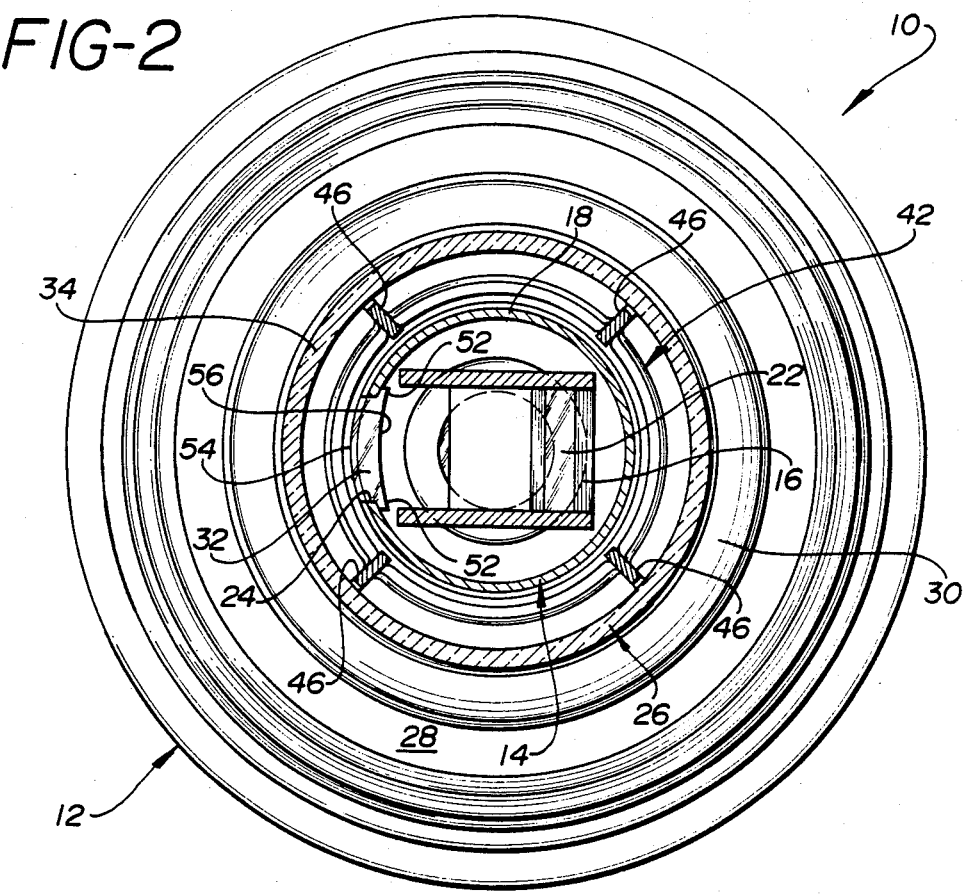
FIG. 2 is a top cross-sectional view taken along line 2—2 of FIG. 1.

Reference is made to FIGS. 1 and 2 of the drawings which illustrate the upper portion of a reference laser beam projecting apparatus, generally designated 10, which incorporates the improvements of the present invention. The projecting apparatus 10, except for the improvements to be described later, may be generally similar to that disclosed in the aforementioned U.S. Pat. No. 4,062,634 to Rando et al, the disclosure of which is incorporated by reference herein. The basic components and arrangement of the apparatus 10 will be described below to the extent necessary to obtain a general understanding of the apparatus so as to facilitate an appreciation of the improvements thereto provided by the present invention.

The reference laser beam projecting apparatus 10 includes a hollow cylindrical housing 12 which provides a sealed, water-tight enclosure for the internal components of the apparatus which include a laser beam source (not shown). When the housing 12 is placed in an upright position as seen in FIG. 1, the reference laser beam B is directed upward along a vertical axis into a pentaprism reflecting head, generally indicated at 14. The laser beam reflecting head 14 comprises a pentaprism assembly 16 and a cylindrical rotator or holder 18 which supports the assembly 16 and is rotated about the vertical axis by means of a motor (not shown) mounted to the chassis. The pentaprism assembly 16 has a pair of reflecting surfaces 20,22 which are accurately aligned for diverting the beam B from the vertical axis to a direction generally perpendicular thereto, outwardly through a window 24 defined in the holder 18. As the pentaprism assembly 16 rotates with the holder 18 it causes rotation of the laser beam B about the vertical axis of the apparatus 10 so as to define a horizontal reference plane P.

Referring still to FIGS. 1 and 2, there is also shown the improvements of the present invention provided in the reference laser beam projecting apparatus 10. These improvements basically relate to three features incorporated in the apparatus 10, namely, a generally cylindrical one-piece molded transparent lighthouse structure 26 mounted on an upper end 28 of the apparatus housing 12 so as to allow transmission of the rotating laser beam B therethrough, a continuous resilient flexible ring 30 adapted to fit about the lighthouse structure 26 for removably anchoring the structure in a sealed relationship to the housing 12, and a beam compensating lens 32 aligned in the path of the laser beam B to correct for the divergence in the laser beam which occurs when the beam passes through the preferred embodiment of the lighthouse structure 26.

More particularly, the preferred embodiment of the lighthouse structure 26 has an improved, generally cylindrical, one-piece molded construction with a conical configuration. The conical configuration provides the draft required to secure release of the molded structure from its mold, and thereby facilitates fabrication thereof by conventional molding processes. The molded lighthouse structure 26 has a continuous vertical side wall 34, a top annular wall 36 merging at its outer edge with the top of the side wall, and an upper central inverted cup 38 merging at its lower outer edge with the inner edge of the top annular wall.

The purpose of the upper central cup 38 is to accommodate a bearing assembly 40 which rotatably supports the pentaprism reflecting head 14 from above. The bearing assembly 40 is rigidly positioned within but held in spaced relation to the lighthouse cup 38 by a cup-like support structure 42 located between the lighthouse structure 26 and the pentaprism assembly holder 18. The bearing support structure 42 at its lower end is connected to the housing upper end 28 inwardly of the location at which a bottom flange 44 on the lighthouse side wall 34 seats on the housing upper end. The support structure 42 has four spaced legs 46 (as seen in FIG. 2) which extend generally vertically between the lighthouse side wall 34 and the holder 18 and comprise the only part of the support structure 42 which crosses the path of the rotating laser beam B. Each of the legs 46 is of a cross-sectional size relative to the width of the rotating laser beam B which is calculated to avoid production of any blind spot in the reference plane P.

The continuous ring 30 has an annular groove 48 defined thereon which adapts the ring to releasably attach to the housing 12. Specifically, the flexible ring 30 can be forced over and seated on an annular rib 50 formed on housing upper end 28 such that the rib 50 extends within the groove 48. The rib 50 is spaced outwardly from the lower end of the bearing support structure 42 and outwardly of the location at which bottom flange 44 on the side wall 34 seats on the housing end 28. Also, the opening of the ring 30 is sized smaller than the lighthouse side wall 34 so as to tightly fit about and grip the molded lighthouse structure 26 for removably anchoring it to the housing 12 in the sealed relationship. This provides a water-tight enclosure for the pentaprism reflecting head 14. Advantageously, the continuous resilient ring 30 imposes a generally uniform attaching pressure about the lighthouse structure 26 so as to minimize the likelihood of optical distortion of the structure over its useful life.

If the cylindrical lighthouse structure 26 were to be in the form of a right cylinder, such as fabricated from diamond turned plastic and provided with machined optical surfaces, no significant variation would occur in the amount of divergence of laser beam B and, therefore, the compensating lens 32 would have a constant convergence in all horizontal planes and zero convergence in a vertical plane. However, since, the molded lighthouse structure 26 has a conical configuration in the preferred embodiment in which its side wall 34 is non-vertical such that the side wall radii of the lighthouse structure, extending from the vertical axis of the apparatus 10 and defining the conical configuration, decrease from the bottom to the top of side wall. The conical configuration of the lighthouse 26 thus produces divergence of the laser beam B which is greater at the top of the beam B than at the bottom of the beam B.

Figure 3:
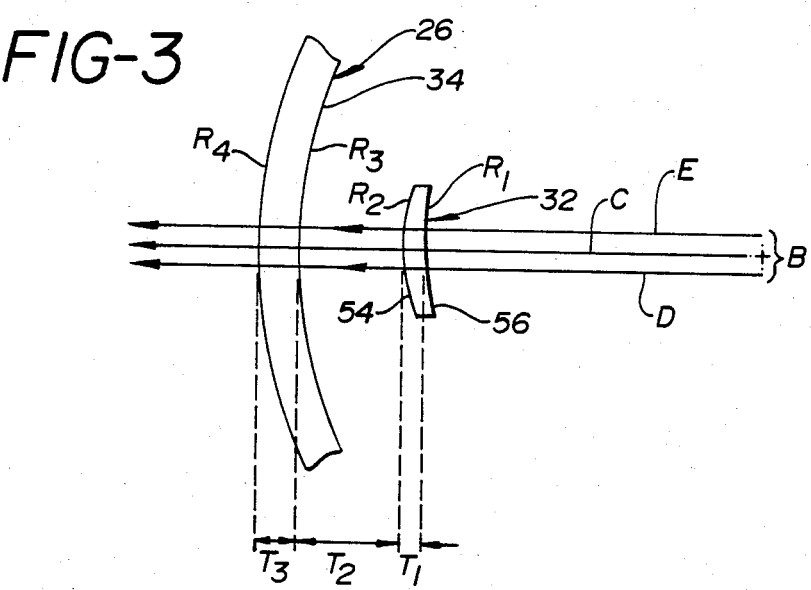
FIG. 3 is a diagrammatic top plan view of a reference laser beam being transmitted through the lighthouse structure side wall and through the compensating lens.

FIG. 3 illustrates a top diagrammatic view of the compensating lens 32, lighthouse structure side wall 34, and laser beam B, are depicted in a plane parallel to the reference plane. Divergence is a result of the width of the beam B. If the beam B is thought of as being made up of a group of parallel rays, a ray C in the center of the beam travels along a radius of the lighthouse structure 26 and passes straight through its side wall 34, with only a slight amount of refraction vertically due to the non-vertical wall orientation. This refraction occurs both upon entry into and exit from the side wall, however, so that the ray C emerges from the lighthouse 26 in a plane which is parallel to its original plane but very slightly shifted upward. Unlike the center ray C of the beam B, each of the rays D and E on either side of the center ray C do not travel along a radius of the lighthouse structure side wall 34 and, therefore, these rays are refracted away from the center ray C within the plane of the rotating beam B as they pass through the lighthouse structure 26, thus producing divergence of the beam in the reference plane. Such divergence if left uncorrected reduces the level of intensity and range of detectability of the rotating laser beam B.

The beam compensating lens 32 is mounted to the cylindrical holder 18 of the pentaprism reflecting head 14 within the window 24 of the holder, such as by being adhesively attached thereto along its opposite side edges 52. Lens 32 is aligned in a desired optically registered relationship with the lighthouse structure side wall 34 and across the path of the laser beam passing through the window. As seen in FIG. 3, the compensating lens 32 is configured to correct the known divergence in the laser beam B which occurs when the beam passes through the conical side wall 34 of the lighthouse structure 26.

More particularly, the compensating lens 32 is optically registered or coupled with the molded lighthouse structure 26 and moves with the pentaprism assembly 16 such that appropriate correction will be applied to the rotating laser beam B by the lens from the top to the bottom of the beam. Preferably, the lens 32 is in the form of a positive meniscus lens and has a uniform cross-sectional thickness along its center in the vertical direction. Therefore, the lens 32 has zero converging power in planes generally perpendicular to the reference plane and ray C in FIG. 3 will not be affected in the reference plane. However, the radii $R_2$ and $R_1$ of the front and rear lens surfaces 54,56 change linearly in the verical direction, with the radii both decreasing from the bottom to the top of the lens. The radius of the rear surface 56 of the lens 32 is longer than that of the front surface 54 at each plane through the lens parallel to the reference plane. Thus, the lens 32 is configured to have variable converging power in planes generally parallel to the reference plane for converging the rays D and E in advance of, and by the same degree as, their divergence when they pass through the side wall 34 of the molded lighthouse structure 26. As a result, the compensating lens 32 and the molded conical cylindrical lighthouse structure 26, when taken together, are the optical equivalent of a flat window having opposite parallel surfaces through which rays C, D and E are transmitted, and from which they emerge, in parallel relationship.

In the preferred embodiment, both the lighthouse structure 26 and the compensating lens 32 may be made of any suitable thermoplastic material, for example acrylic resin which has an index of refraction of 1.48. As an example, some typical values (in millimeters) of the radii and thicknesses of the lighthouse structure side wall 34, the compensating lens 32, displacements between them, and the image location, as identified in FIG. 3, are listed below in Table I:

TABLE I

| Radius in millimeters | | Thickness in millimeters | |
|---|---|---|---|
| At top of beam: | | | |
| $R_1$ | 57.917 | $T_1$ | 3 |
| $R_2$ | 54.3089 | $T_2$ | 10.16 |
| $R_3$ | 47.0981 | $T_3$ | 5.08 |
| $R_4$ | 52.1781 | $T_4$ | 12279286.1 (image at infinity) - image formed by the beam |
| At center of beam: | | | |
| $R_1$ | 59 | $T_1$ | 3 |
| $R_2$ | 55.42 | $T_2$ | 10.16 |
| $R_3$ | 48.209 | $T_3$ | 5.08 |
| $R_4$ | 53.289 | $T_4$ | 6444945.7 (image at infinity) - image formed by the beam |
| At bottom of beam: | | | |
| $R_1$ | 60.083 | $T_1$ | 3 |
| $R_2$ | 56.5311 | $T_2$ | 10.16 |
| $R_3$ | 49.3203 | $T_3$ | 5.08 |
| $R_4$ | 54.4003 | $T_4$ | 16219553.2 (image at infinity) - image formed by the beam |

The normal working distance between the reference laser beam projecting apparatus 10 and a reference beam detector is less than 1500 feet. Compared to that working distance, the location from the lighthouse structure 26 of the image formed by the beam at each of the top, center and bottom of the beam as given in Table I above is equivalent to infinity. The level of intensity and range of detectability of the corrected beam are more than sufficient for all applications contemplated for the reference laser beam projecting apparatus 10.

Having thus described the improvements of the present invention in detail and by reference to a preferred embodiment thereof, it will be apparent that modifications and variations are possible without departing from the scope of the invention defined in the appended claims.

What is claimed is:

1. Apparatus for projecting a laser beam in a reference plane, comprising:
   a housing having an annular rib,
   means in said housing for generating a laser beam, a beam diverting assembly mounted for receiving said laser beam and deflecting said laser beam outwardly of said housing in said reference plane, a generally cylindrical, transparent lighthouse structure overlying said beam diverting assembly and mounted on said housing so as to allow transmission of said laser beam therethrough, said lighthouse structure including a flange for contacting said housing within said annular rib, and a continuous, resilient, flexible ring, engaging said annular rib and said flange in an overlying relation for anchoring said lighthouse structure to said housing in a sealed relationship so as to provide a water-tight enclosure for said beam diverting assembly.

2. The apparatus of claim 1 in which said ring is adapted to releasably attach to said rib and tightly fit about said lighthouse structure for removably anchoring said lighthouse structure to said housing so as to impose a generally uniform attaching pressure about said lighthouse structure.

3. The apparatus of claim 1 in which said lighthouse structure has a one-piece molded construction.

4. The apparatus of claim 1 in which said lighthouse structure has a tapered configuration for facilitating molding thereof.

5. The apparatus of claim 1 in which said lighthouse structure is made of a transparent thermoplastic material.

6. Apparatus for projecting a laser beam in a reference plane, comprising:

a housing, means in said housing for generating a laser beam, a beam diverting assembly mounted on said housing for receiving said laser beam and deflecting said laser beam outwardly of said housing in said reference plane, a generally cylindrical, transparent lighthouse structure overlying said beam diverting assembly and mounted on said housing so as to allow transmission of said laser beam therethrough, and beam compensating means aligned in the path of said laser beam for correcting divergence in said laser beam which occurs when said beam passes through said lighthouse structure.

7. The apparatus of claim 6 in which said lighthouse structure has a one-piece molded construction with a conical configuration for facilitating molding thereof, said configuration producing a divergence of said laser beam as it passes through said structure which is aligned in planes generally parallel to said reference plane.

8. The apparatus of claim 7 in which said compensating means is a compensating lens having variable converging power in planes generally parallel to said reference plane and zero converging power in planes generally perpendicular to said reference plane.

9. The apparatus of claim 8 in which said compensating lens has a uniform center cross-sectional thickness.

10. The apparatus of claim 8 in which said compensating lens is in the form of a positive meniscus lens.

11. The apparatus of claim 10 in which radii of front and rear surfaces of said compensating lens change linearly in the vertical direction.

12. The apparatus of claim 11 in which said radius of said rear surface of said lens is longer than that of said front surface at each plane through said lens surfaces parallel to said reference plane.

13. In an apparatus for projecting a laser beam in a reference plane wherein said apparatus includes a housing, means in said housing for generating a laser beam, a beam diverting assembly mounted for rotational movement with respect to an end of said housing for receiving said laser beam projected from said housing and routing said laser beam outwardly of said housing so as to define said reference plane as said assembly is rotated, the improvement which comprises:

a generally cylindrical, one-piece molded transparent lighthouse structure overlying said beam diverting assembly and stationarily mounted on said end of said housing so as to allow transmission of said laser beam therethrough, said lighthouse structure having a tapered configuration facilitating molding thereof but which produces a divergence of said laser beam as it passes through said structure;

a continuous, resilient, flexible ring adapted to releasably attach to said housing and tightly fit about said lighthouse structure for removably anchoring said lighthouse structure to said housing in a sealed relationship so as to provide a water-tight enclosure for said beam diverting assembly and to impose a generally uniform attaching pressure about said lighthouse structure; and a beam compensating lens aligned in the path of said laser beam and coupled with said beam diverting assembly for movement therewith, said compensating lens being configured to correct said divergence in said laser beam which occurs when said beam passes through said lighthouse structure.

14. The apparatus of claim 13 in which said lighthouse structure has a one-piece molded construction with a conical configuration for facilitating molding thereof, said configuration producing divergence of said laser beam as it passes through said structure, said divergence varying in planes generally parallel to said reference plane.

15. The apparatus of claim 14 in which said beam compensating lens is a lens having variable converging power in planes generally parallel to said reference plane and zero converging power in planes generally perpendicular to said reference plane.

16. The apparatus of claim 15 in which said compensating lens has a uniform center cross-sectional thickness in the vertical direction.

17. The apparatus of claim 15 in which said compensating lens is in the form of a positive meniscus lens.

18. The apparatus of claim 17 in which radii of front and rear surfaces of said positive meniscus lens change linearly in the vertical direction.

19. The apparatus of claim 18 in which the radius of the rear surface of said lens is longer than the radius of the front surface at each plane through the rear and front lens parallel to said reference plane.

20. The apparatus of claim 13 in which said lighthouse structure and said compensating lens are made of a transparent thermoplastic material.

* * * * *